J. MORRIS.
Meat Cutter.
No. 2,476.
Patented Feb. 28, 1842.
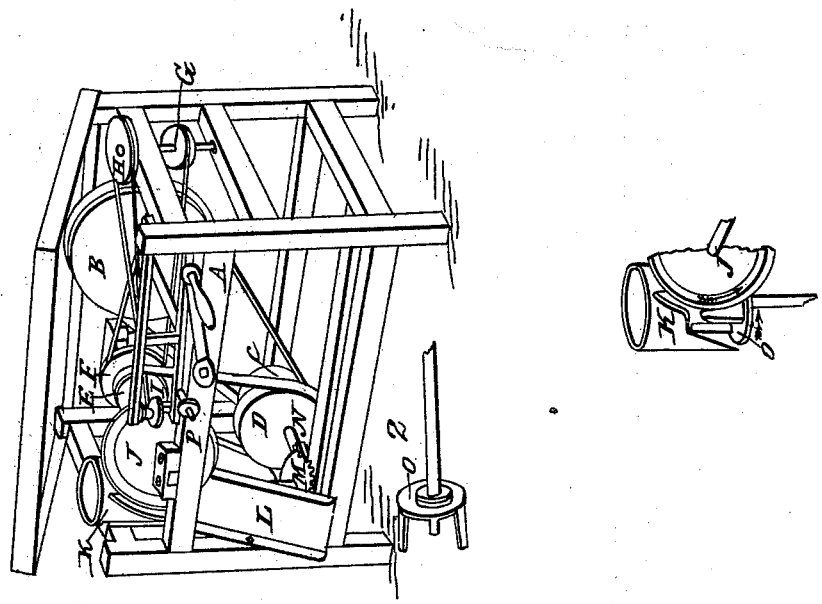

UNITED STATES PATENT OFFICE.

JOHN MORRIS, OF DERBY, CONNECTICUT.

MACHINE FOR CUTTING MEAT AND OTHER SUBSTANCES.

Specification of Letters Patent No. 2,476, dated February 28, 1842.

*To all whom it may concern:*

Be it known that I, JOHN MORRIS, of Derby, in the county of New Haven and State of Connecticut, have invented a new and useful Machine called "Morris's Revolving Circular Self-Sharpening Machine" for Cutting Meat and other Soft Substances, which I describe as follows.

A represents the frame 3 feet long, 2 feet 6 inches wide and 3 feet 4 inches high. The timber may be 3 inches square. This frame is covered with a platform, and rests on the corner posts of the same, for the purpose of holding the meat or material to be cut, this platform has a hole through it near the end directly over and corresponding with the top of the feeder case, K. This machine is represented with the platform raised a little in order to show the interior as per drawing. B, first driving wheel 20 inches diameter on the first shaft to which is attached a crank, this shaft of iron, should be one inch diameter, 2 feet 10 inches long. The bearings 2 inches from each end corresponding with the two upper side girts of the frame on which it rests, the wheel is put on the shaft near the farther end, and just within, the opposite side girt. C first leading pulley on lower shaft 6 inches diameter, D second driving pulley on the same shaft 12 inches diameter. This shaft 1 inch diameter and 1 foot 7 inches in length, rests on the center and lower back girts of the frame 6 inches from the end. The leading pulley is placed upon it so as to correspond with the driving pulley on the first shaft. E, second leading pulley on cutter shaft 6 inches diameter, F third driving pulley on the same shaft 6 inches diameter; this shaft may be made of steel 2 feet long 1¼ inches diameter, pointed at both ends so as to revolve in suitable boxes, fastened by caps, bolted on the upper side girts of the frame about 12 inches from the end. G third leading pulley on the first perpendicular shaft 2 inches diameter, H fourth driving pulley on the same shaft 4 inches diameter, this shaft 8 inches long ½ inch diameter is pointed at the lower end and rests on the middle end girt as per drawing, the upper end is attached to the upper girt by a cap as usual. I, fourth leading pulley on second perpendicular shaft 2 inches diameter which is connected with the revolving sharpener 4 inches diameter, this sharpener may be made of oil stone or any other substance that will sharpen the same; this shaft 4 inches long and ½ inch diameter is pointed at the lower end and revolves in suitable boxes as usual, inserted near one end of a frame 20 inches long and 6 inches wide, made of timber about an inch square, this frame is attached to the upper end girt of the main frame by a bolt, the band from the driving pulley H, to the leading pulley I, draws the sharpener to the edge of the revolving cutter J, the pressure against the cutter is regulated by means of a thumb nut that turns on a screw attached to this movable frame, this nut presses against the side girt of the main frame, as represented by the letter P. J the cutter. This cutter may be made of a plate of steel ⅛ of an inch thick, this plate is secured to a flange fastened on the shaft already described, about 4 inches from the end, the side of the cutter next to the feeder should be entirely flat and smooth, the outer edge is ground with a bevel. K, the feeder case or hopper may be of metal 9 inches high and 6 inches diameter. It has a flange at the bottom and ears on the top to secure it to the frame. It has a slot or circular opening on the side to receive the cutter. This opening permits the edge of the cutter to enter within the case about the sixteenth of an inch. This may be varied as the case requires.

L represents the conductor or spout made of wood or other materials sufficient to receive and convey the cuttings from the machine.

M represents a bevel wheel 6 inches diameter this is attached to the lower end of a perpendicular shaft that revolves in the feeder case K to which the feeder O is also attached and is driven by the pinion or bevel wheel N 3 inches diameter. This wheel is attached to the second shaft to which the driving pulley D is attached already described. This gear proportions the speed of the feeder O, to the cutter J, Fig. 2.

O represents the feeder. This feeder may be conical on the top with two, three or more uprights; these uprights should be nicely fitted to the edge of the cutter, the lower end passing the edge of the cutter first, thus producing a shear cut; this feeder may be made of iron or steel and attached to the upper end of the shaft in the feeder case K as has been noted.

I claim as my invention, and wish to secure—

The feeder O in combination with the receiver K and the cutter J as herein described and represented in the drawings.

JOHN MORRIS.

Witnesses:
PETER PHELPS,
HENRY WHITNEY.